Figure 1:
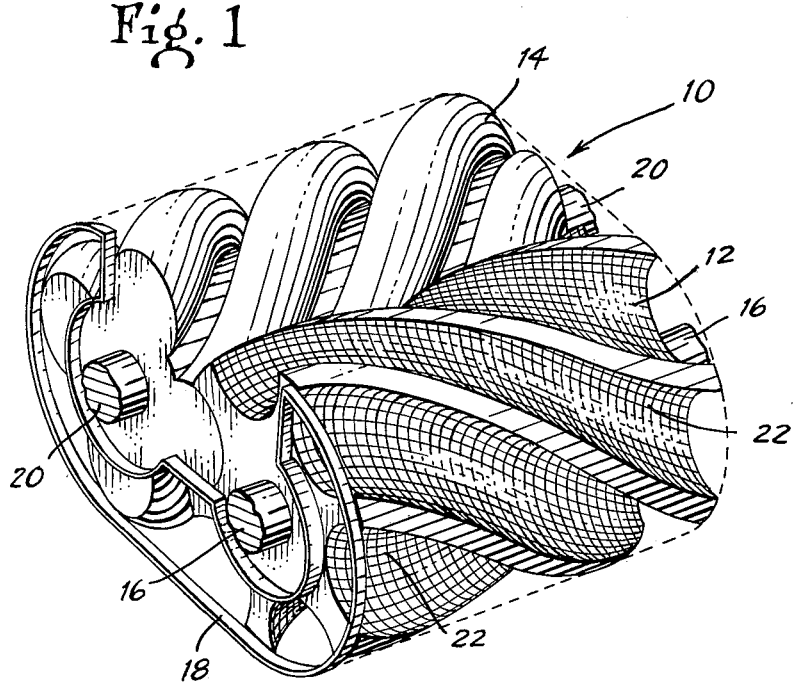

Jan. 1, 1963

R. M. FLANAGAN 3,071,314

SCREW COMPRESSOR SEAL

Filed Nov. 12, 1959

INVENTOR
Robert M. Flanagan,

BY Diggins & Le Blanc

ATTORNEYS

United States Patent Office 3,071,314
Patented Jan. 1, 1963

3,071,314
SCREW COMPRESSOR SEAL
Robert M. Flanagan, Sayville, N.Y., assignor to Fairchild Stratos Corporation, a corporation of Maryland
Filed Nov. 12, 1959, Ser. No. 852,398
5 Claims. (Cl. 230—143)

This invention relates to a sealing arrangement for screw compressors and more particularly is directed to a novel coating seal for double helical rotary type compressors.

In double helical rotor machines the sealing between the lands and grooves of the male and female rotors has always been a problem. When the device is used in high temperature applications the sealing problem becomes further complicated.

Resilient and plastic coatings of various types have been applied to rotating parts which parts are run initially at a negative clearance in order to establish a tight seal between the parts. However, each of the coatings heretofore used have exhibited several serious disadvantages. Plastic coatings tend to fatigue under the repeated stresses to which they are subjected and likewise do not exhibit satisfactory sealing characteristics at the high temperatures accompanying the high compression ratios of modern equipment. The resilient coatings such as rubber and rubber-like material likewise are not suited for high temperature application and further tend to abrade. Resilient coatings are subject to having small particles torn loose from the coatings which particles catch on the moving parts and may become distributed in the fluid being processed.

The plain metallic coatings tested have, in general, been unsatisfactory and in some instances tend to tear away from the surface to which they are applied. In every case the coating materials have not exhibited satisfactory wear characteristics.

The present invention avoids the above mentioned difficulties by incorporating a relieved metallic coating on the female rotor of a screw compressor having sufficient ductility and a sufficient quantity of relieved surface space to redistribute itself as the rotors are run in. The result is a better seal between rotor surfaces with less leakage and higher volumetric efficiency and one usable at temperatures as high as 750° F. without any change in characteristics and without abrasion. The coating exhibits an extremely long life with a minimum of wear.

It is therefore a primary object of the present invention to provide a novel seal for relatively movable surfaces.

Another object of the present invention is to provide a novel seal for double helical rotor machines.

Another object of the present invention is to provide an improved coating seal for the rotors of a double helical rotary compressor resulting in less leakage and a higher volumetric efficiency.

Another object of the present invention is to provide a relieved metallic coating for the female rotor of a double helical rotary compressor.

Figure 2:
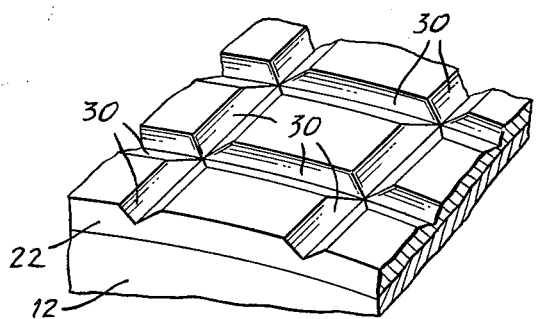

These and other objects and advantages of the invention will become more apparent upon reference to the following specification, claims and appended drawings wherein:

FIGURE 1 of the drawing shows a double helical rotary compressor incorporating a relieved lead coating over the female rotor surface in accordance with the present invention; and FIGURE 2 is an enlarged cross section through the surface of the female rotor showing in perspective the relieved metallic coating of FIGURE 1.

Referring to the drawing the rotary compressor generally indicated at 10 comprises a driven or male rotor 14 and a sealing or female rotor 12, both of helical configuration. Rotor 14 is driven by means of a shaft 20 suitably journalled in a housing 18. Rotor 12 is similarly mounted to rotate upon a shaft 16 and is rotated in synchronism with the male rotor 14 by means of a suitable coupling between the driven shaft 20 and idler shaft 16 in a well known manner.

An important feature of the present invention includes the provision of a ductile metallic coating 22 preferably formed of lead over the surfaces of the female rotor to provide a seal between the adjacent rotating surfaces of the helical members. Although the lead coating may be applied to the entire surface of each rotor if desired it is preferably omitted from the male rotor and just applied to the female rotor.

An additional important feature of the present invention is the fact that the lead coating exhibits a relieved or knurled surface having sufficient spacing between the ridges to permit redistribution of the lead material without causing the lead to become wavy or buckled.

FIGURE 2 shows an enlarged view of a portion of the lead coating 22 covering the rotor 12. As seen the coating is provided with a plurality of criss-crossing V-shaped grooves 30 forming a grid or waffle-like pattern in the surface of the coating. The V-shaped grooves are of sufficient size to permit the lead material between to flow into them when the rotors are run in.

Helical rotary compressors of the general type shown comprising a pair of intermeshing rotors contained in a close fitting housing are known. The rotor lobes are not generated profiles but are circular profiles which mesh with a rolling rather than a sliding motion. Power is applied to the male rotor of the compressor through the male rotor shaft. The female rotor is driven from the male rotor by suitable timing gears and acts as a rotary seal. The male rotor sustains virtually all of the compression loading and the timing gears are required to accept only the small inertial bearing and seal friction loads. These machines are capable of operating at speeds as high as 50,000 r.p.m.

In operation the groove portions of the rotor 12 are completely coated with lead of a sufficient thickness so that the rotors run initially with a negative clearance. It is necessary that the lead surface be relieved or knurled with sufficient spacing between ridges or raised portions to permit the lead to redistribute itself under mechanical stress when the machine is first run with an interference, and in this way the rotors are "run in" in a jig or the like so that they mate perfectly. It has been found that if the coating is not sufficiently relieved or knurled to permit redistribution of the lead the lead tends to flow but does not have sufficient space so that a wave in the lead coating is generated causing the coating to destroy itself. Any desired relieved pattern may be employed with sufficient spacing to permit redistribution of the lead when the rotor is run in at an initial negative clearance.

The lead becomes redistributed under the physical stresses to which it is subjected and because of its ductility is forced into adjacent grooves by the negative clearance. After the machine has been briefly run in the rotors mate substantially perfectly with zero clearance and optimum sealing is achieved. While lead has been disclosed as the preferred material other metals having suitable strength, ductility and a sufficiently high melting point may be employed. If desired the male rotor may be coated with a different material and for example may be chrome plated.

The machine of the present invention may be operated at speeds as high as 40,000 to 50,000 r.p.m. and at temperatures as high as 750° F. which temperatures are sometimes encountered at the higher compression ratios. The machine similarly operates with equal facility at the lower temperatures. The relieved lead coating provides an improved seal resulting in more efficient rotor sealing and a very marked improvement in the wearing properties of the rotor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency, of the claims are therefore intended to be embraced therein.

What is claimed and desired to be secured by United States Letters Patent is:

1. A screw compressor comprising a pair of mating helical rotors, a ductile metallic coating on one of said rotors having a plurality of raised projecting portions on the outer surface thereof producing initial interference between said rotors, the maximum thickness of said coating at said raised portions being greater than the clearance between said rotors and the minimum thickness of said coating between said raised portions being less than the clearance between said rotors, said surface possessing sufficient spacing between the raised portions thereof to permit plastic flow of the coating material in said raised portions into the spaces between said raised portions under physical stress caused by a relative movement of said rotors during run-in operation to eliminate said interference and to produce substantially smooth mating surfaces having no leakage paths.

2. A compressor according to claim 1 wherein said coating is limited to the female rotor of said pair.

3. A compressor according to claim 2 wherein said coating is lead.

4. A compressor according to claim 3 wherein said coating is formed with a series of criss-cross V-shaped grooves.

5. A compressor according to claim 4 wherein the male rotor of said pair is chrome plated.

References Cited in the file of this patent

UNITED STATES PATENTS

| | | |
|---|---|---|
| 1,021,180 | Clifton | Mar. 26, 1912 |
| 1,053,677 | Sutton | Feb. 18, 1913 |
| 1,785,386 | McIntyre | Dec. 16, 1930 |
| 2,075,995 | Morgan | Apr. 6, 1937 |
| 2,220,588 | Thompson | Nov. 5, 1940 |
| 2,345,975 | Herman | Apr. 4, 1944 |
| 2,395,824 | Herman | Mar. 5, 1946 |
| 2,492,935 | McCulloch et al. | Dec. 27, 1949 |
| 2,519,557 | Flanagan | Aug. 22, 1950 |
| 2,530,173 | Oldberg | Nov. 14, 1950 |
| 2,619,040 | Maisch | Nov. 25, 1952 |
| 2,622,787 | Nilsson | Dec. 23, 1952 |
| 2,633,083 | Smith | Mar. 31, 1953 |
| 2,649,651 | Townhill | Aug. 25, 1953 |
| 2,754,050 | Wellington | July 10, 1956 |
| 2,868,442 | Nilsson | Jan. 13, 1959 |

FOREIGN PATENTS

| | | |
|---|---|---|
| 525,761 | Great Britain | Sept. 4, 1940 |
| 534,092 | Great Britain | Feb. 17, 1941 |
| 535,554 | Great Britain | Apr. 11, 1941 |
| 724,353 | Great Britain | Feb. 16, 1955 |
| 753,772 | Great Britain | Aug. 1, 1956 |
| 893,524 | France | Jan. 31, 1944 |